(12) United States Patent
Rowberry et al.

(10) Patent No.: US 12,453,337 B2
(45) Date of Patent: Oct. 28, 2025

(54) APPARATUS AND METHOD FOR EGG WASHING BRUSH

(71) Applicants: Timothy Rowberry, Midvale, UT (US); Bryce Van Leuven, Riverton, UT (US)

(72) Inventors: Timothy Rowberry, Midvale, UT (US); Bryce Van Leuven, Riverton, UT (US)

(*) Notice: Subject to any disclaimer, the term of this patent is extended or adjusted under 35 U.S.C. 154(b) by 83 days.

(21) Appl. No.: 18/396,595

(22) Filed: Dec. 26, 2023

(65) Prior Publication Data

US 2024/0341287 A1    Oct. 17, 2024

Related U.S. Application Data

(60) Provisional application No. 63/495,363, filed on Apr. 11, 2023.

(51) Int. Cl.
*A01K 43/00*     (2006.01)
*A46B 9/02*      (2006.01)
*A46B 15/00*     (2006.01)
*A46D 1/00*      (2006.01)

(52) U.S. Cl.
CPC ............ *A01K 43/005* (2013.01); *A46B 9/026* (2013.01); *A46B 15/0081* (2013.01); *A46D 1/0207* (2013.01); *A46B 2200/3073* (2013.01)

(58) Field of Classification Search
CPC .................................................. A01K 43/005
See application file for complete search history.

(56) References Cited

U.S. PATENT DOCUMENTS 3,516,104 A * 6/1970 Hobbs ................ A01K 43/005
                                                            15/3.13
2002/0069472 A1   6/2002 Glass

FOREIGN PATENT DOCUMENTS

CN    109819911 A  *  5/2019
CN    111512996 A     8/2020
KR    100927036 B1 * 11/2009

OTHER PUBLICATIONS

Machine translation: CN-109819911-A (Year: 2019).*
Machine translation: KR-100927036-B1; Yoo, B. (Year: 2009).*
Machine translation: CN111512996; Qu, N. (Year: 2020).*
U.S. Appl. No. 18/615,876 "Office Action Summary", USPTO, May 24, 2024, pp. 1-8.

* cited by examiner

*Primary Examiner* — Natasha N Campbell
(74) *Attorney, Agent, or Firm* — Kunzler Bean & Adamson

(57) ABSTRACT

Disclosed herein is an egg washing brush apparatus to clean an individual egg, the apparatus comprising a deformable half egg-shaped shell comprising a plurality of bristle bands, a plurality of protrusions extending inward from the bristle bands and configured to contact an egg, and at least one drainage window in the half egg-shaped shell.

20 Claims, 3 Drawing Sheets

APPARATUS AND METHOD FOR EGG WASHING BRUSH

CROSS-REFERENCES TO RELATED APPLICATIONS

This is a Nonprovisional application of and claims priority to U.S. Provisional Patent Application No. 63/495,363 entitled "APPARATUS AND METHOD FOR EGG WASHING BRUSH" and filed on Apr. 11, 2023 for Timothy Rowberry and Bryce Van Leuven which is incorporated herein by reference.

FIELD OF THE INVENTION

This invention relates to poultry farming tools and more particularly relates to egg washing.

BACKGROUND

Description of the Related Art

Commercial poultry farms typically utilize automatic egg cleaning machines of various sizes adapted to the production demand. However, a hobby egg farmer or individual consumer must currently make do with brushes created for other purposes, or with flat devices styled as egg brushes but not compatible with the contours of an egg. Therefore, a need exists for an individual egg cleaning apparatus contoured to contact and clean the surface of an individual egg. Beneficially the cleaning apparatus would be abrasive enough to clean, but not damage, the egg and would be convenient to use and easy to clean.

SUMMARY

From the foregoing discussion, it should be apparent that a need exists for an apparatus, system, and method that effectively and conveniently cleans an individual egg. Beneficially, such an apparatus, system, and method would be easy to use, clean, and maintain.

The present invention has been developed in response to the present state of the art, and in particular, in response to the problems and needs in the art that have not yet been fully solved by currently available egg cleaning brushes. Accordingly, the present invention has been developed to provide an apparatus and method for individual egg cleaning that overcome many or all of the above-discussed shortcomings in the art.

Provided herein is an apparatus for cleaning an individual egg. In some embodiments the apparatus comprises an egg washing brush apparatus to clean an individual poultry egg, the apparatus comprising a deformable half egg-shaped shell sized for the type of egg to be washed and further comprising a plurality of bristle bands defining an egg washing cavity, a plurality of protrusions extending inward from the bristle bands and configured to contact an egg and at least one drainage window in the egg washing cavity. In various embodiments the plurality of bristle bands comprise a flexible material such as silicon or other water resistant, deformable material. In some embodiments the bristle band comprises a scraping ridge.

The half egg-shaped shell provided herein may comprise a circular rim which sometimes comprises a plurality of protrusions extending inward and may comprise one or more bristle bands connecting to the circular rim with protrusions extending inward. These bristle bands may intersect each other and may define the at least one drainage window.

Further provided herein is method for cleaning an individual egg, the method comprising providing an egg washing brush apparatus to clean an individual egg. In various embodiments the apparatus comprises a deformable half egg-shaped shell comprising a plurality of bristle bands defining an egg washing cavity, a plurality of protrusions extending inward from the bristle bands and configured to contact an egg; and at least one drainage window in the egg washing cavity; Inserting an egg into the egg washing cavity; optionally providing a cleaning agent, introducing the cleaning agent into the egg washing cavity; and rotating the egg within the egg washing cavity so as to contact the bristles. In some embodiments the cleaning agent comprises running water and may include soap, detergent, or an enzymatic cleanser.

In some embodiments the method comprising removing the egg from the egg washing cavity and inspecting the egg for cleanliness, rinsing the egg, and repeating the method if necessary. In various embodiments the method further comprising removing the egg from the egg washing cavity, deforming the half egg-shaped shell to elevate the cleaning ridge and removing the remaining material on the egg by scraping the material with the cleaning ridge, rinsing the egg, and inspecting the egg for cleanliness. The method may be repeated as necessary.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
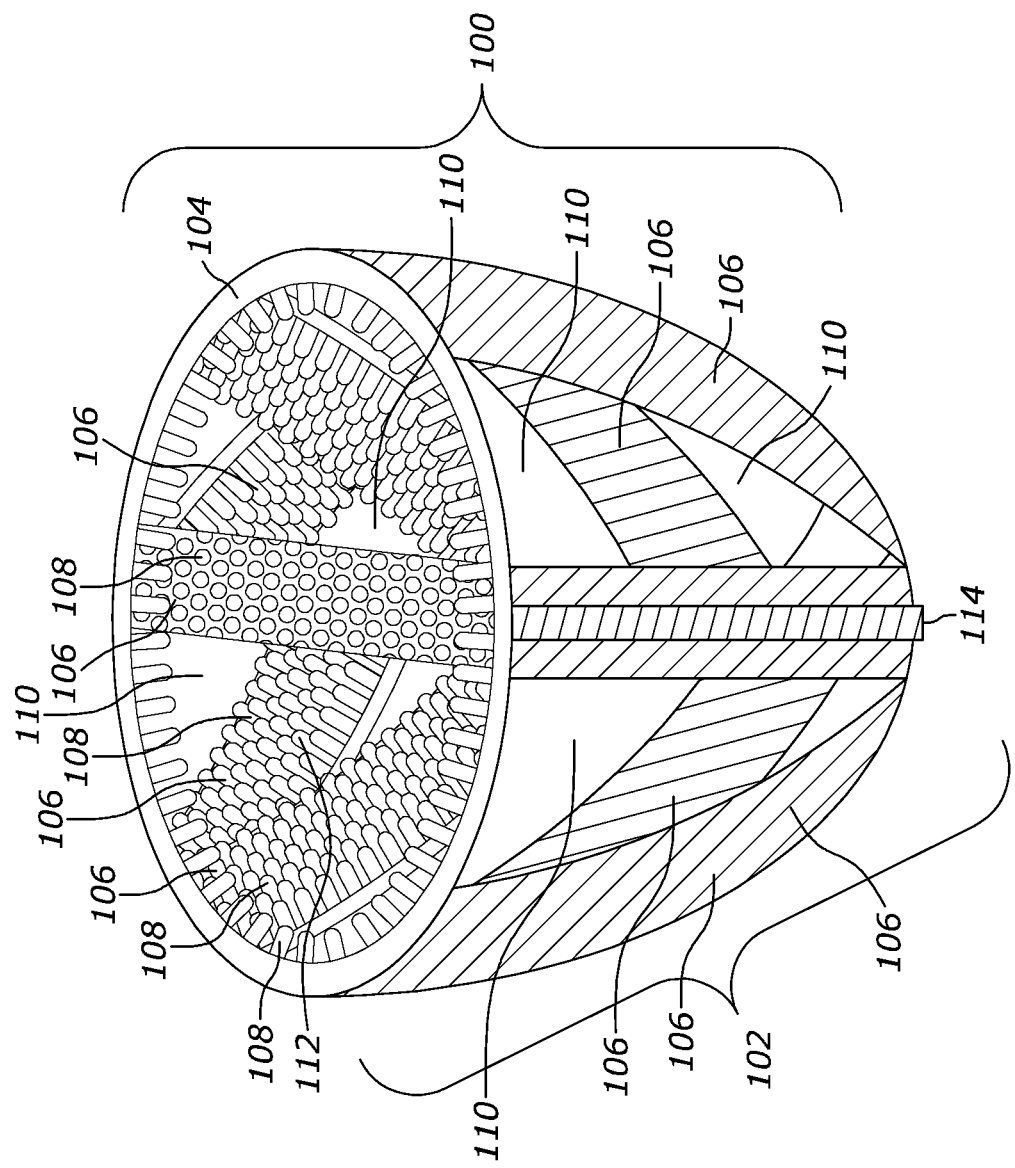
FIG. 1 is a perspective line drawing depicting an inside view of one embodiment of an egg washing brush in accordance with the present invention.

FIG. 1 depicts an embodiment of an inside view of an apparatus for an egg washing brush 100. As depicted the apparatus 100 comprises a deformable half egg-shaped shell 102 comprising a circular rim 104, a bristle band 106, bristles 108, a drain window 110, an egg cavity 112 and a scraping module 114.

In certain embodiments the egg washing brush 100 is made from silicon or other flexible, waterproof, durable material. In some embodiments a plurality of bristle bands 106 define the egg cavity 112. In various embodiments a first end of the bristle band 106 is attached to the circular rim 104 and a second end of the bristle band 106 is attached to the opposite side of the circular rim 104. A series of bristles bands 106 may be thusly attached around the circular rim 104. The bristle bands 106 may be spaced to as to leave open areas for the drain windows. The bristles 108 may be semi-rigid and short enough to leave the egg cavity 112 substantially open. The egg washing brush 100 is sometimes configured in various sizes to accommodate different sizes and sources of eggs. In certain embodiments the scraping ridge 114 is positioned on the outside of one or more of the bristle bands 106.

A user may insert the egg to be cleaned end first into the egg washing brush 100, contacting the bristles 108. The user may then turn the egg and the egg washing brush 100 in opposing, reversing directions to abrade and remove material from the eggshell. The egg washing brush 100 may be used dry, under running water, in still water, and with various cleaning agents including but not limited to soap, detergent, and enzyme cleaners. After cleaning the user may remove the egg from the egg washing brush 100 for inspection. If material remains stuck to the eggshell the user may grasp the deformable, half egg-shaped shell in a folding motion to expose the scraping ridge 114. The scraping ridge 114 may then be rubbed against the eggshell to remove any remaining material. This operation may be performed dry, with liquid, and/or with various cleaning agents. At the conclusion of cleaning the egg washing brush 100 may be easily cleaned with water and/or with additional cleansing agents.

Figure 2:
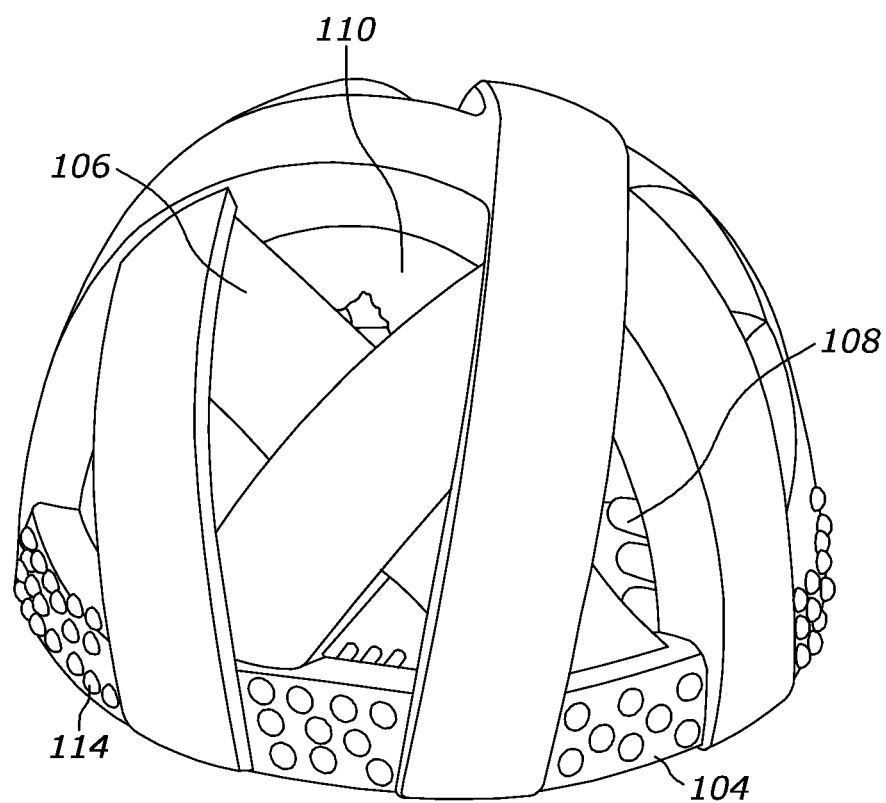
FIG. 2 is a perspective line drawing depicting an outside view of one embodiment of an egg washing brush in accordance with the present invention.

FIG. 2 depicts an outside view of an embodiment of an apparatus for an egg washing brush 100, comprising a deformable egg-shaped shell 102, comprising a circular rim 104, a bristle band 106, bristles 108, a drain window 110, and a scraping module 114.

Figure 3:
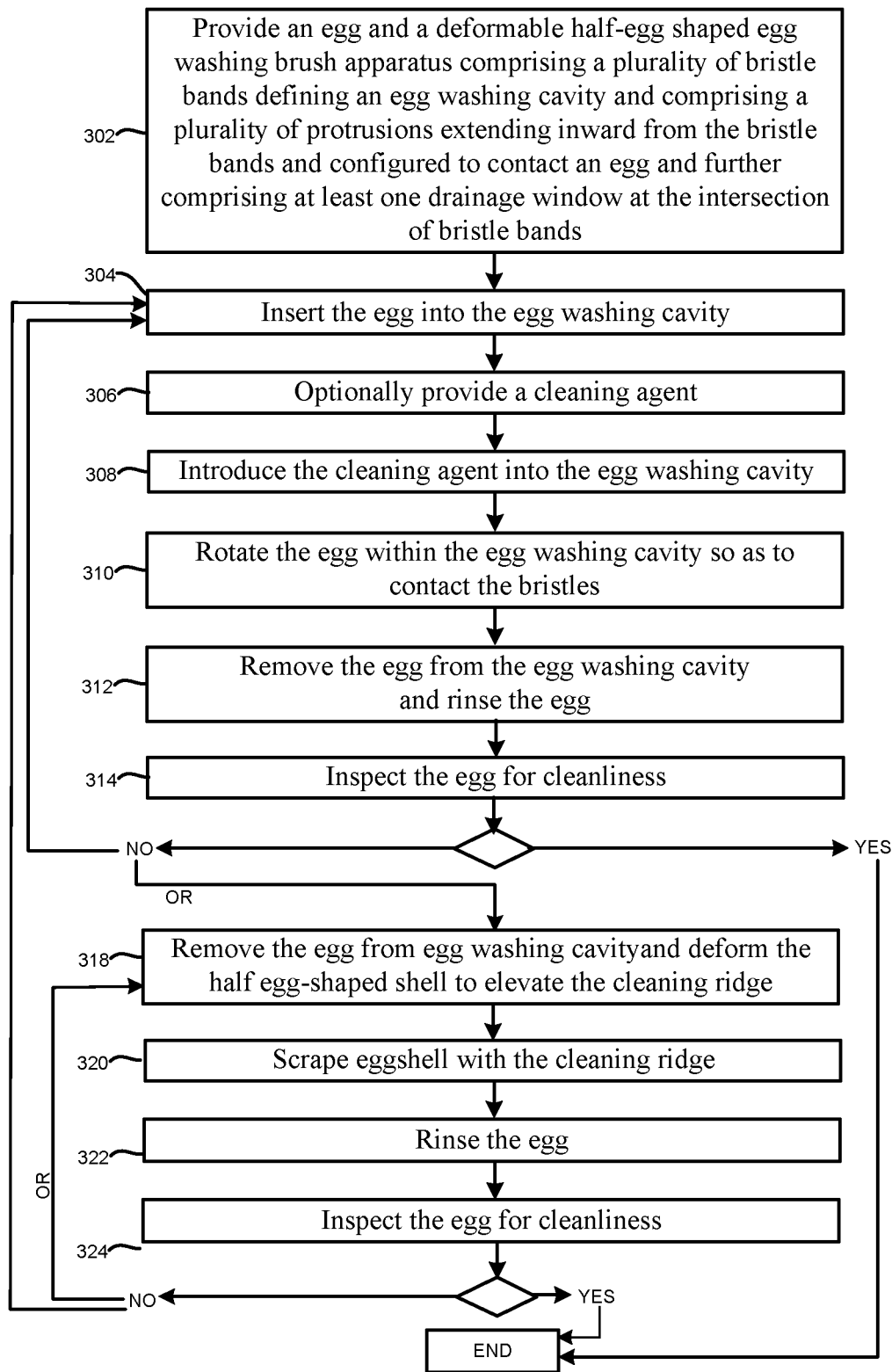
FIG. 3 is a flow chart illustrating a method for cleaning an egg in accordance with the present invention.

FIG. 3 depicts a method for washing an egg using the egg washing brush disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hand-held egg washing brush apparatus to clean an individual poultry egg, the apparatus comprising:
   a. an isolated half egg-shaped shell, the half egg-shaped shell comprising a perimeter rim defining an access opening to a fixed egg washing cavity;
   b. the isolated half egg-shaped comprising an integral and inherently deformable material and comprising a plurality of protrusions extending inward from the washing cavity and configured to contact an egg; and
   c. the egg washing brush apparatus comprising no hinges or mechanical parts and being self-contained and operable by hand.

2. The apparatus of claim 1 wherein the half egg-shaped shell comprises silicon or other water resistant, deformable material.

3. The apparatus of claim 2 wherein the half-egg-shaped shell comprises at least one drainage window.

4. The apparatus of claim 3 wherein the perimeter rim comprises a plurality of bristle protrusions extending inward.

5. The apparatus of claim 4 wherein the half egg-shaped shell comprises a scraping ridge.

6. The apparatus of claim 5 wherein the half egg-shaped shell comprises one or more bristle bands connecting to at least one of the perimeter rim and/or to other bristle bands or both and comprising a plurality of bristle protrusions extending inward.

7. The apparatus of claim 6 wherein the bristle bands intersect each other.

8. The apparatus of claim 7 wherein the half egg-shaped shell is sized for the type of egg to be washed.

9. The apparatus of claim 8 wherein the perimeter rim of the half egg-shaped shell can be elevated to turn the apparatus inside out.

10. A method for cleaning an individual egg, the method comprising:
   a. providing an egg washing brush apparatus to clean an individual egg, the apparatus comprising:
      a deformable half egg-shaped shell comprising a perimeter rim defining an access opening to a fixed egg washing cavity; and
      a plurality of bristle protrusions extending inward from an interior surface of the egg washing cavity and configured to contact an egg;
   b. inserting an egg into the egg washing cavity;
   c. optionally providing a cleaning agent;
   d. introducing the cleaning agent into the egg washing cavity; and
   e. Rotating the egg within the egg washing cavity so as to contact the bristle protrusions.

11. The method of claim 10 wherein the cleaning agent comprises at least one of running water, soap, detergent, an enzymatic cleanser or other cleaning agent.

12. The method of claim 11 further comprising removing the egg from the egg washing cavity and inspecting the egg for cleanliness.

13. The method of claim 12 further comprising repeating the method if necessary.

14. The method of claim 13 further comprising removing the egg from the egg washing cavity and optionally deforming the half egg-shaped shell to elevate the cleaning ridge.

15. The method of claim 14 further comprising removing remaining material on the egg by scraping the material with the cleaning ridge.

16. The method of claim 15 further comprising rinsing the egg.

17. The method of claim 16 further comprising cleaning the egg washing brush apparatus, including by turning the egg washing brush apparatus inside out for cleaning.

18. A kit for washing a poultry egg, the kit comprising the egg washing brush of claim 1 and at least one of a soap, a detergent, an enzymatic cleanser or other cleaning agent.

19. An apparatus for an easy to clean egg washing brush to clean an individual poultry egg, the apparatus comprising a deformable half egg-shaped shell sized for a poultry egg and having a plurality of bristle protrusions extending inward from the interior surface of the half egg-shaped shell, the plurality of bristle protrusions configured to contact the egg and wherein the deformable half egg-shaped shell can be inverted to expose an interior surface of the egg washing brush and the bristle protrusions for further cleaning of the egg or for cleaning of the interior surface of the egg washing brush.

20. A method for cleaning a deformable egg washing brush having a circular rim and a plurality of interior bristle protrusions, the method comprising:
   a. providing a deformable egg washing brush having a circular perimeter rim defining an egg washing cavity and a plurality of interior bristle protrusions;
   b. elevating the circular rim to invert the deformable egg washing brush, exposing an interior surface and the interior bristle protrusions;
   c. optionally provide a cleaning agent;
   d. rinsing the inverted egg washing brush;
   e. repeating as necessary.

* * * * *